US012055501B2

(12) United States Patent
Sato

(10) Patent No.: US 12,055,501 B2
(45) Date of Patent: Aug. 6, 2024

(54) SOAKING MACHINE OF SINGLE-CRYSTAL X-RAY STRUCTURE ANALYSIS SAMPLE, AND SOAKING METHOD THEREFOR

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 456 days.

(21) Appl. No.: 17/295,860

(22) PCT Filed: Nov. 21, 2019

(86) PCT No.: PCT/JP2019/045692
§ 371 (c)(1),
(2) Date: May 20, 2021

(87) PCT Pub. No.: WO2020/105723
PCT Pub. Date: May 28, 2020

(65) Prior Publication Data
US 2022/0011251 A1  Jan. 13, 2022

(30) Foreign Application Priority Data
Nov. 23, 2018 (JP) .................... 2018-219809

(51) Int. Cl.
*G01N 23/20025* (2018.01)
*G01N 1/28* (2006.01)
(Continued)

(52) U.S. Cl.
CPC .......... *G01N 23/2055* (2013.01); *G01N 1/28* (2013.01); *G01N 23/20025* (2013.01); *G01N 23/207* (2013.01)

(58) Field of Classification Search
None
See application file for complete search history.

(56) References Cited

U.S. PATENT DOCUMENTS 6,355,217 B1  3/2002  Kiefersauer et al.
6,918,698 B2  7/2005  Nordmeyer et al.
(Continued)

FOREIGN PATENT DOCUMENTS

JP  H06-194276 A  7/1994
JP  H11-304999 A  11/1999
(Continued)

OTHER PUBLICATIONS

Yasuhide Inokuma, Makoto Fujita et al; "X-ray analysis on the nanogram to microgram scale using porous complexes"; Nature 495, 461-466; Mar. 28, 2013.
(Continued)

*Primary Examiner* — Patrick Assouad
*Assistant Examiner* — Mark A Shabman
(74) *Attorney, Agent, or Firm* — ASLAN LAW, P.C.

(57) ABSTRACT

A soaking machine of a single-crystal X-ray structure analysis sample, that makes it possible to surely perform soaking by supplying a sample into a porous complex crystal; and a soaking method therefor, are provided. There is provided is a soaking machine 300 for soaking a sample, comprising a supply section that supplies the sample into an applicator 311 in which a sample holder 310 that holds a porous complex crystal is inserted, a temperature adjustment section 320 that controls a temperature of the applicator 311, a discharge section that carries out the sample from the inside of the applicator 311 in which the sample holder 310 is
(Continued)

inserted, and a control section 340 that controls the supply section, the temperature adjustment section 320 and the discharge section.

20 Claims, 13 Drawing Sheets

(51) Int. Cl.
*G01N 23/2055* (2018.01)
*G01N 23/207* (2018.01)

(56) References Cited

U.S. PATENT DOCUMENTS

| | | | |
|---|---|---|---|
| 7,274,769 | B2 | 9/2007 | Nordmeyer et al. |
| 7,696,991 | B2 | 4/2010 | Higashi |
| 10,190,952 | B2 | 1/2019 | Fujita et al. |
| 10,684,198 | B2 | 6/2020 | Fujita et al. |
| 2003/0152194 | A1* | 8/2003 | Nordmeyer ............. C30B 33/00 378/74 |
| 2005/0163280 | A1 | 7/2005 | Nordmeyer et al. |
| 2007/0005268 | A1* | 1/2007 | Higashi ............. G01N 23/2055 702/27 |
| 2007/0228049 | A1 | 10/2007 | Nordmeyer et al. |
| 2014/0314206 | A1* | 10/2014 | Yasukawa ............. G01N 23/205 378/71 |
| 2015/0219533 | A1 | 8/2015 | Fujita et al. |
| 2017/0219500 | A1 | 8/2017 | Fujita et al. |
| 2019/0137367 | A1 | 5/2019 | Fujita et al. |

FOREIGN PATENT DOCUMENTS

| | | | |
|---|---|---|---|
| JP | 2003-083412 | A | 3/2003 |
| JP | 2007-003394 | A | 1/2007 |
| JP | 2013-156218 | A | 8/2013 |
| JP | WO 2014/038220 | A1 | 3/2014 |
| JP | 2014-130063 | A | 7/2014 |
| JP | WO 2016/017770 | A1 | 7/2017 |
| JP | 2018-155680 | A | 10/2018 |
| WO | WO 2011/115223 | A1 | 9/2011 |
| WO | WO 2015/132909 | A1 | 9/2015 |

OTHER PUBLICATIONS

Hoshino et al., "The crystalline sponge method updated", IUCrJ, (2016), 3, 139-151.
猪熊泰英、常識を覆 す結晶構造解析「結晶スポ ンジ」
法.化学 Yasuhide Inokuma, "'Crystal sponge' method overturns common sense of crystal structure analysis", Chemistry, vol. 68, No. 8, pp. 35-40. In particular, p. 39, fig.5, non-officieal translataion, Aug. 1, 2013.
猪熊泰英、「結晶ス ポンジ法による極 小量化合物 のX線結晶構造解析」 Inokuma, Yasuhide et al., "X-ray crystallography of extremely small amount of compounds by crystal sponge method", Farumashia , 2014, vol. 50, No. 8, pp. 756-761, col. "5. Application of crystal sponge method", fig. 4, non-official translation.
Yasuhide Inokuma, "'Crystal sponge' method overturns common sense of crystal structure analysis", Chemistry, vol. 68, No. 8, pp. 35-40, in particular, p. 39, fig.5, Non-official translataion, Aug. 1, 2013.
Inokuma, Yasuhide et al., "X-ray crystallography of extremely small amount of compounds by crystal sponge method", Farumashia , 2014, vol. 50, No. 8, pp. 756-761, col. "5. Application of crystal sponge method", fig. 4, non-official translation.
CN Office Action issued in CN Application No. 201980088982.5, The State Intellectual Property Office of People's Republic of China, China, Jan. 26, 2024, 5 pages.
CN Office Action issued in CN Application No. 201980088995.2, Jan. 23, 2024, The State IP Office, People's Republic of China, 14 pages.
EP Search Report issued in EP Application No. 19 887 842.3, Sep. 19, 2022, EPO, Germany, 8 pages.
JP Office Action issued in JP Application No. 2020-557651, Feb. 28, 2023, JPO, Japan, 3 pages.
European Patent Office, EP Search Report issued in EP Application No. 19 887 842.3, Munich Germany, Sep. 14, 2022, 8 pages.

\* cited by examiner

SOAKING MACHINE OF SINGLE-CRYSTAL X-RAY STRUCTURE ANALYSIS SAMPLE, AND SOAKING METHOD THEREFOR

CROSS-REFERENCE TO RELATED APPLICATIONS

This application claims priority to JP Patent Application No. 2018-219809 filed on Nov. 23, 2018, and this application claims priority to and is a 371 of international PCT Application No. PCT/JP2019/045692 filed on Nov. 21, 2019, the entire contents of which are hereby incorporated by reference.

TECHNICAL FIELD

The present invention relates to an apparatus for preparing an analysis sample used in single-crystal X-ray structure analysis, and to a method therefor; and specifically relates to a soaking machine of a single-crystal X-ray structure analysis sample suitable for soaking the sample in a crystalline sponge, and to a soaking method therefor.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system that can be performed by anyone who is not a specialist of X-rays has been demanded. In this regard, as is known from the following Patent Document 1, the single-crystal X-ray structure analysis has gained attention specifically as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores having a diameter of 0.5 to 1 nm are formed).

In the field of single-crystal X-ray structure analysis, when analyzing a single-crystal sample with a single-crystal X-ray structure analysis apparatus to determine a crystal structure of the single-crystal, the single-crystal sample as an analysis object was difficult to be prepared, and skillfulness of such as experience and intuition was further required for determining the crystal structure of the single-crystal from data obtained by analyzing the single-crystal sample of an analysis object thereof with the single-crystal X-ray structure analysis apparatus; and thus this was able to be only performed by a very limited number of persons.

On the other hand, in recent years, as technological development of single-crystal X-ray structure analysis apparatus moves ahead, a person who is not skilled in crystal structure analysis technology would be able to analyze a single-crystal sample with the single-crystal X-ray structure analysis apparatus if only the single-crystal sample can be available, and thus the crystal structure of the single-crystal sample has been able to be relatively easily determined.

PRIOR ART DOCUMENT

Patent Document

Patent Document 1: Japanese Unexamined Patent Application Publication No. 2007-3394
Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013
Non-Patent Document 2: Hoshino et al. (2016), The updated crystalline sponge method IUCrJ, 3, 139-151

SUMMARY OF THE INVENTION

Problems To Be Solved By The Invention

According to a conventional technique, as described in Non-Patent Document 1, the crystal structure of a single-crystal can be relatively easily determined by forming a very small and fragile crystalline sponge in which a plurality of fine pores are formed and soaking a sample inside the fine pores of this crystalline sponge to analyze this by a single-crystal X-ray structure analysis apparatus.

In order to perform analysis using this crystalline sponge with the single-crystal X-ray structure analysis apparatus, it becomes necessary to surely attach a sample made into a single-crystal, that is soaked inside the fine pores of the crystalline sponge and is formed therein, to a part (a tip of a goniometer head pin) of a sample holder used for performing analysis by the single-crystal X-ray structure analysis apparatus. However, a method of surely attaching a sample soaked in a very small and fragile crystalline sponge and formed therein, to a sample holder, is not disclosed in the above-described conventional technique.

The present invention is to provide a soaking machine-soaking machine of a single-crystal X-ray structure analysis sample, that makes it possible to surely perform soaking by supplying an analysis sample into this crystalline sponge in a state where the very small and fragile crystalline sponge for making the analysis sample into single-crystal is held by the sample holder in the single-crystal X-ray structure analysis apparatus, and to a soaking method therefor, by solving problems of the above-described conventional technique.

Means To Solve The Problems (1) In order to achieve the above-described object, it is a feature that the soaking machinesoaking machine according to the present invention is a soaking machinesoaking machine for soaking a sample, the apparatus comprising a supply section that supplies the sample into an applicator in which a sample holder that holds a porous complex crystal is inserted, a temperature adjustment section that controls a temperature of the applicator, a discharge section that carries out the sample from the inside of the applicator in which the sample holder is inserted, and a control section that controls the supply section, the temperature adjustment section and the discharge section.

(2) Further, it is a feature that, in the soaking machine according to the present invention, the supply section comprising an injection pipe supplies the sample into the applicator by passing through a first through-hole formed in the sample holder, via the injection pipe inserted in the applicator.

(3) Further, it is a feature that, in the soaking machine according to the present invention, the discharge section comprising a discharge pipe carries out the sample from the inside of the applicator by passing through a second through-hole formed in the sample holder, via the discharge pipe inserted in the applicator.

(4) Further, it is a feature that, in the soaking machine according to the present invention, the supply section comprises a supply side first actuator that adjusts a pressure or a flow rate of the sample supplied from outside; a supply side analysis section that analyzes a component of the sample of which the pressure or the flow rate is adjusted by the supply side first actuator; a supply side second actuator that adjusts a pressure or a flow rate of the sample analyzed by the supply side analysis section; and an injection pipe that supplies the sample of which the pressure or the flow rate is adjusted by the supply side second actuator into the applicator, the injection pipe inserted in the applicator by passing through a first through-hole formed in the sample holder.

(5) Further, it is a feature that, in the soaking machine according to the present invention, the discharge section comprises a discharge pipe to be inserted in the applicator by passing through a second through-hole formed in the sample holder; a discharge side first actuator to which the sample is discharged from the inside of the applicator via the discharge pipe; a discharge side analysis section that analyzes a component of the sample discharged to the discharge side first actuator; and a discharge side second actuator that adjusts a pressure, a flow rate or a concentration of the sample whose component is analyzed by the discharge side analysis section to discharge the sample.

(6) Further, it is a feature that the soaking machine according to the present invention is the soaking machine, the supply section comprising a supply side first actuator that adjusts a pressure or a flow rate of the sample supplied from the outside; a supply side analysis section that analyzes a component of the sample of which the pressure or the flow rate is adjusted by the supply side first actuator; a supply side second actuator that adjusts a pressure or a flow rate of the sample analyzed by the supply side analysis section; an injection pipe through which the sample of which the pressure or the flow rate is adjusted by the supply side second actuator is supplied into the applicator, the injection pipe inserted in the applicator by passing through a first through-hole formed in the sample holder; a discharge pipe inserted in the applicator by passing through a second through-hole formed in the sample holder; a discharge side first actuator to which the sample is discharged from the inside of the applicator via the discharge pipe; a discharge side analysis section that analyzes a component of the sample discharged to the discharge side first actuator; and a discharge side second actuator that adjusts a pressure, a flow rate or a concentration of the sample whose component is analyzed by the discharge side analysis section to discharge the sample, wherein the sample discharged to the discharge side second actuator is returned to the supply side first actuator.

(7) Further, it is a feature that, in the soaking machine according to the present invention, the control section controlling the supply section, the temperature adjustment section and the discharge section controls a soaking condition under which the sample is soaked in the porous complex crystal held by the sample holder.

(8) Further, it is a feature that the soaking machine according to the present invention is the soaking machine comprising a reading section that reads information held by an information holding section provided to the sample holder or the applicator, wherein the control section stores the information read by the reading section.

(9) Further, it is a feature that, in the soaking machine according to the present invention, the control section controls the supply section, the temperature adjustment section and the discharge section depending on a type of the sample supplied to the applicator from the supply section, based on the information read by the reading section.

(10) Further, it is a feature that the soaking method according to the present invention is a soaking method for soaking a sample, the method comprising the steps of supplying the sample from a soaking machine to an applicator in which a sample holder that holds a porous complex crystal is inserted, and discharging the sample supplied to the applicator from the inside of the applicator by the soaking machine, wherein at least one of the step of supplying and the step of discharging is performed in a state where a soaking condition including either one of a concentration, a pressure, a temperature and a time of the sample is controlled.

(11) Further, it is a feature that, the soaking method according to the present invention, the step of supplying the sample is performed by passing through a first through-hole formed in the sample holder, via an injection pipe inserted in the applicator.

(12) Further, it is a feature that, in the soaking method according to the present invention, the step of discharging is performed by carrying out the sample by passing through a second through-hole formed in the sample holder, via a discharge pipe inserted in the applicator.

Effect Of The Invention

The soaking machine according to the present invention makes it possible to surely perform soaking by supplying an analysis sample into the porous complex crystal in a state where a crystalline sponge that is a very small and fragile porous complex crystal for making the analysis sample into a single-crystal is held at a sample holder in the single-crystal X-ray structure analysis apparatus.

DETAILED DESCRIPTION OF EMBODIMENTS

Figure 1:
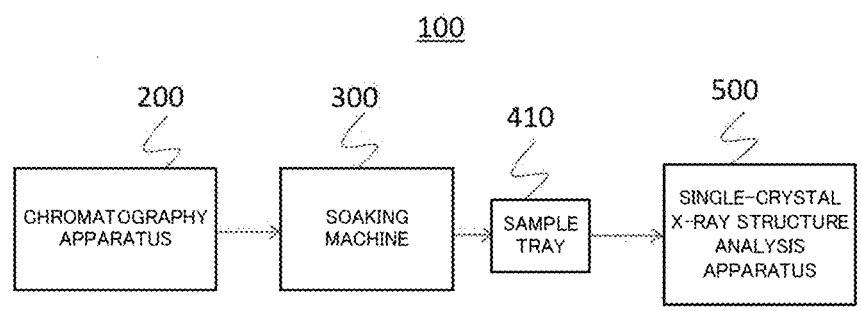
FIG. 1 is a block diagram showing an outline configuration of the entire single-crystal X-ray structure analysis system comprising a single-crystal X-ray structure analysis apparatus relating to Example 1 according to the present invention.

Next, a soaking machine of a single-crystal structure analysis sample for a single-crystal X-ray structure analysis apparatus, that makes it possible to soak an analysis sample in a sponge-shaped material (crystalline sponge or porous complex crystal) and surely supply the sample thereto as a sample holder of the single-crystal X-ray structure analysis apparatus, according to the present invention; and a soaking method therefor are described referring to the drawings. In addition, the expression of "A or B" in the present application means "at least one of A and B", and includes "A and B" unless there are exceptional circumstances where there exists no possibility of A and B.

FIG. 1 shows an outline configuration of the entire single-crystal X-ray structure analysis system 100 comprising a single-crystal X-ray structure analysis apparatus relating to the present Example. The single-crystal X-ray structure analysis system 100 relating to the preset Example comprises a chromatography apparatus 200 that extracts an analysis object sample from samples such as a gas sample, a liquid sample or the like; a soaking machine 300 for a single-crystal X-ray structure analysis apparatus (hereinafter, also referred to simply as a soaking machine 300), that prepares a sample for single-crystal X-ray structure analysis from the sample obtained via extraction thereof with the chromatography apparatus 200; a sample tray 410 in which single-crystal X-ray structure analysis samples prepared with the soaking machine 300 are stored; and a single-crystal X-ray structure analysis apparatus 500 that analyzes each of the samples stored in the sample tray 410, using X-rays. In addition, the sample may be made to singly move from the soaking machine 300 to the single-crystal X-ray structure analysis apparatus 500 without using the sample tray 410.

Figure 2:
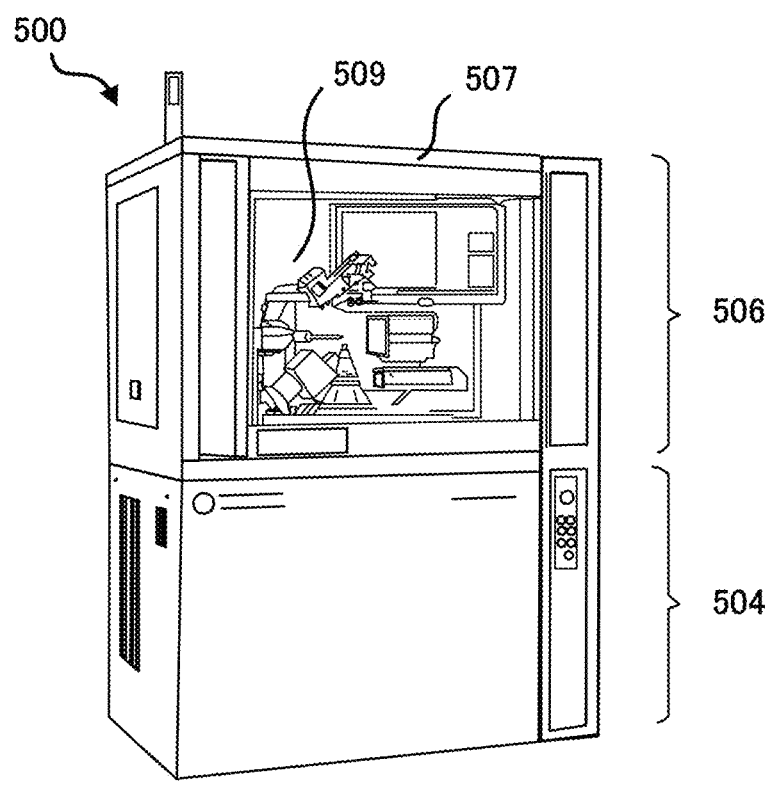
FIG. 2 is a perspective view showing a configuration of the single-crystal X-ray structure analysis apparatus relating to Example 1 according to the present invention.

The attached FIG. 2 shows the entire appearance configuration of a single-crystal X-ray structure analysis apparatus provided with a single-crystal X-ray diffractometer according to one embodiment of the present invention, and as is clear from the figure, the single-crystal X-ray structure analysis apparatus 500 comprises a base stand 504 in which a cooling device and an X-ray generation power supply unit are stored, and an X-ray protection cover 506 placed on the base stand 504.

The X-ray protection cover 506 is provided with a casing 507 surrounding the single-crystal X-ray diffractometer 509, a door provided in front of the casing 507, and so forth. The door provided in front of the casing 507 is openable, and in this opened state, various operations can be performed for the internal single-crystal X-ray diffractometer 509. In addition, the present embodiment as shown in the figure is directed to the single-crystal X-ray structure analysis apparatus 500 provided with the single-crystal X-ray diffractometer 509 for performing a structure analysis of a material using the crystalline sponge also mentioned below.

Figure 3:
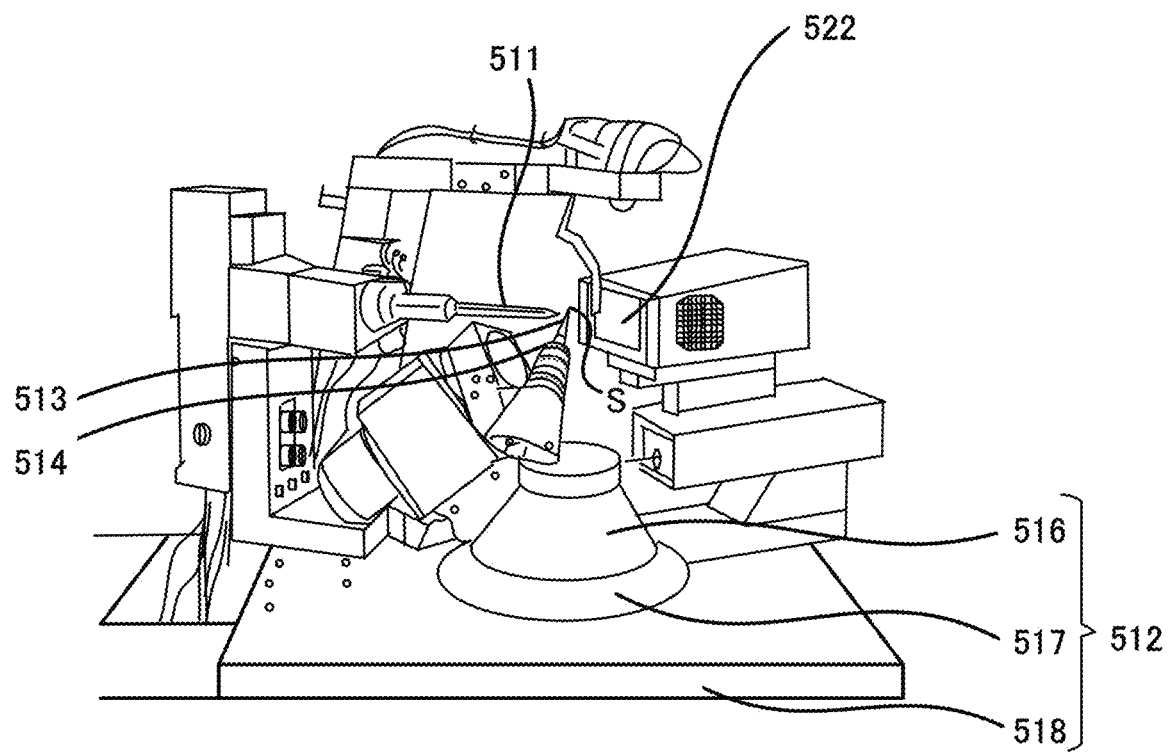
FIG. 3 is a perspective view showing a configuration of a measurement section in the single-crystal X-ray structure analysis apparatus relating to Example 1 according to the present invention.

The single-crystal X-ray diffractometer 509 comprises an X-ray tube 511 and a goniometer 512, as shown in FIG. 3 as well. The X-ray tube 511 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 504 of FIG. 2 generates heat to emit thermal electrons.

Further, a high voltage is applied between the filament and the target by the X-ray generation power supply unit, and the thermal electrons emitted from the filament are accelerated by the high voltage, and collide with the target. This collision area forms an X-ray focal point, and X-rays are generated from the X-ray focal point, and are spread out. In more detail, though not shown in the figure herein, the X-ray tube 511 comprising a microfocus tube and an optical element such as a multilayer focusing mirror or the like makes it possible to irradiate beams with higher brightness, and can also be selected from radiation sources such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 512 supporting a sample S to be analyzed comprises a $\theta$ rotation table 516 that is rotatable centering a sample axis line $\omega$ passing through an X-ray incident point of the sample S, and a $2\theta$ rotation table 517 that is arranged around the $\theta$ rotation table 516 and is rotatable centering the sample axis line $\omega$. The goniometer 512 is provided with a goniometer head 514 with which the sample S is equipped. In addition, according to the present embodiment, the sample S is soaked inside a crystalline sponge previously attached to a part of the sample holder 513 also mentioned below.

Driving devices (not shown in the figure) for driving the above-described $\theta$ rotation table 516 and $2\theta$ rotation table 517 are stored inside a base 518 of the goniometer 512, and the $\theta$ rotation table 516 is driven by these driving devices to be intermittently or continuously rotated at a predetermined angular speed so as to make a so-called $\theta$ rotation. Further, the $2\theta$ rotation table 517 is driven by these driving devices to be intermittently or continuously rotated so as to make a so-called $2\theta$ rotation. The above-described driving devices can be constituted from any structure, and for example, can be constituted from a power transmission structure comprising a worm and a worm wheel.

An X-ray detector 522 is placed on a part of the outer periphery of the goniometer 512, and the X-ray detector 522 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 509 is constituted as described above, and thus the sample S is $\theta$-rotated centering the sample axis line by the $\theta$ rotation of the $\theta$ rotation table 516 in the goniometer 512. During the $\theta$ rotation of this sample S, X-rays generated from the X-ray focal point inside the X-ray tube 511, that is directed to the sample S, enter the sample S at a predetermined angle, and are diffracted/scattered. That is, the incident angle of X-rays entering the sample S changes depending on the $\theta$ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 522 to measure an X-ray intensity thereof. From those described above, an angle of the X-ray detector 522 with respect to the incident X-rays, that is, an intensity of the diffraction X-rays corresponding to a diffraction angle is measured, and a crystal structure concerning the sample S and so forth are analyzed from this measurement result.

Figure 4A:
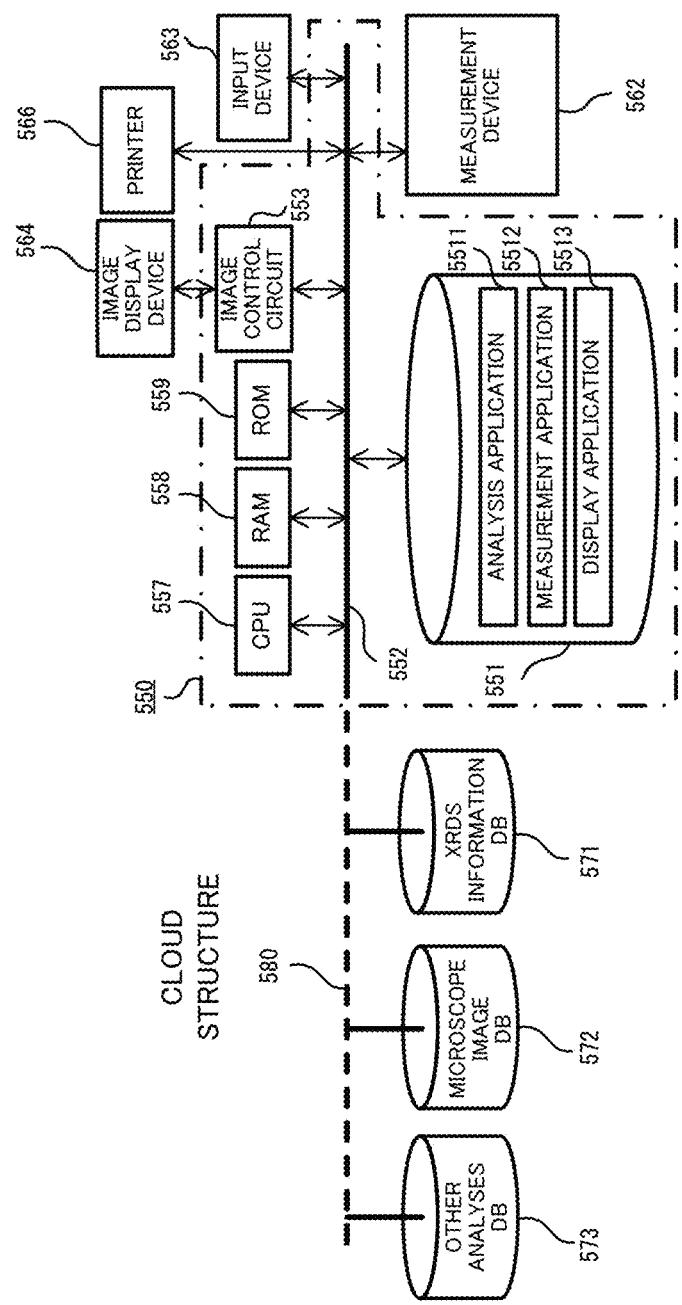
FIG. 4A is a block diagram showing one example of the detail of an electrical internal configuration of the single-crystal X-ray structure analysis apparatus relating to Example 1 according to the present invention.

Next, FIG. 4A shows one example of the detail of an electrical internal configuration constituting a control section 550 in the above-described single-crystal X-ray structure analysis apparatus 500. In addition, as a matter of course, the present invention is not limited to the following embodiments according to the present invention.

This single-crystal X-ray structure analysis apparatus 500 includes the above-described internal configuration and further comprises a measurement device 562 for measuring a suitable material used as a sample; an input device 563 constituted from a keyboard, a mouse and so forth; an image display device 564 as display means; a printer 566 as means for printing and outputting the analysis result; CPU (Central Processing Unit) 557; RAM (Random Access Memory) 558; ROM (Read Only Memory) 559; a hard disk as an external storage medium, and so forth. These elements are connected mutually by a bus 552.

The image display device 564 constituted from an image display unit such as a CRT display, a liquid-crystal display or the like displays an image on a screen in accordance with an image signal generated by an image control circuit 553. The image control circuit 553 generates the image signal based on image data input therein. The image data input in the image control circuit 553 is generated by an operation of every kind of calculation means, achieved by a computer comprising CPU 557, RAM 558, ROM 559, and an analysis section 551 provided with a hard disk.

An inkjet plotter, a dot printer, an inkjet printer, an electrostatic transfer printer, or any other printing unit having arbitrary structure can be used for the printer 556. In addition, the analysis section 551 can be constituted from a magneto-optical disk, a semiconductor memory, or any other storage medium having arbitrary structure in place of the hard disk.

Analysis application software 5511 for managing the overall operation of the single-crystal X-ray structure analysis apparatus 500, measurement application software 5512 for managing the operation of the measurement processing using the measurement device 562, and display application software 5513 for managing the operation of the display processing using the image display device 564 are stored inside the analysis section 551, where a single-crystal structure analysis processing is performed, provided with the hard disk. These pieces of application software achieves a predetermined function after being read from the hard disk in the analysis section 551, as needed, and being transferred to RAM 558.

This single-crystal X-ray structure analysis apparatus 500 further comprises for example, a database placed in a cloud area, the database for storing various measurement results including measurement data obtained by the above-described measurement device 562. Referring to an example of the figure, as is explained below, shown are an XRDS information database 571 that stores XRDS image data obtained by the above-described measurement device 562, and a microscope image database 572 that stores actually measured images obtained by the microscope, and further shown are for example, measurement results obtained via analysis performed with XRF, Raman rays or the like other than X-rays, and the other analysis database 573 that stores physical property information. In addition, these databases are not necessarily stored inside the single-crystal X-ray structure analysis apparatus 500, and for example, they may be provided outside and be connected to be able to communicate mutually via a network 580 or the like.

Figure 4B:
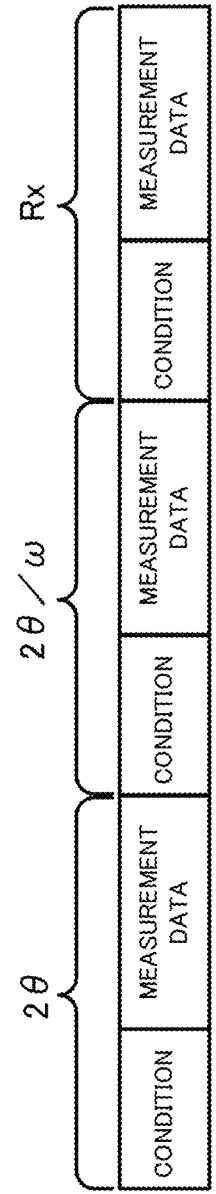
FIG. 4B is a block diagram of a data file showing a file management method for storing a plurality of pieces of measurement data inside the data file as one example of the detail of the electrical internal configuration of the single-crystal X-ray structure analysis apparatus relating to Example 1 according to the present invention.

A method of storing individual measurement data inside an individual file is also taken into account as a file management method for storing a plurality of pieces of measurement data inside a data file, but according to the present embodiment, as shown in FIG. 4B, the plurality of pieces of measurement data are set to be continuously stored inside one data file. In addition, referring to FIG. 4B, storage areas in which "condition" is written are areas for storing every kind of information including device information and measurement conditions when the measurement data is able to be obtained.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not attachments such as a sample high-temperature device and so forth are used, and various other conditions are conceivable.

In addition, information required for soaking thereof may be acquired via the cloud, and the information required for the soaking may be acquired from those stored inside a control section in the soaking machine. For example, the necessary soaking condition can be easily acquired and inputting/setting thereof can be automatically executed by searching for a soaking condition or the like provided via a cloud structure based on specific information of a sample holder or an applicator.

Thus, it becomes possible to unitarily manage data obtained by the subsequent structure analysis processing. Further, it can also be performed more easily to store, verify and manage the sample after measurement/analysis.

According to the above-described example, information is stored in the cloud, but may be stored in a memory (HDD) inside or outside a single-crystal X-ray structure analysis apparatus without being necessarily limited thereto. Further, when the order of samples to be measured is determined in advance, the specific information may be stored in the memory in advance without taking a configuration in which the specific information is acquired from the sample holder as well as the applicator and may be read in order to acquire corresponding information.

Figure 5:
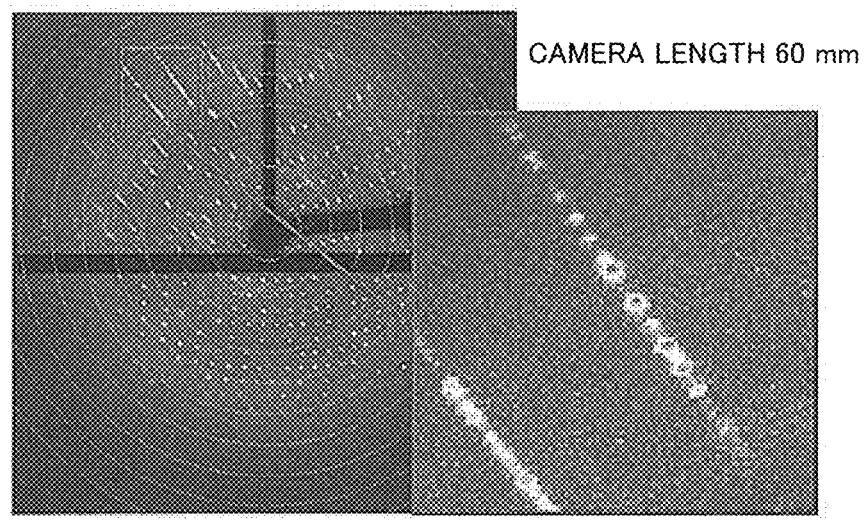
FIG. 5 is a diagram showing an image of an XRDS pattern observed by the single-crystal X-ray structure analysis apparatus relating to Example 1 according to the present invention.

An XRDS (X-ray Diffraction and Scattering) pattern or an image (Refer to FIG. 5) is obtained by receiving/accumulating X-rays received on a flat plane that is a two-dimensional space of the X-ray detector 522 constituting the above-described measurement device 562 for each pixel (for example, CCD or the like) arranged in planar array, that constitutes the detector, and by measuring an intensity thereof. For example, a pattern or an image on a two-dimensional space of r and θ can be obtained by detecting the intensity of X-rays received via an integral, for each pixel of the X-ray detector 522.

Measurement Application Software

The XRDS pattern or the image on an observation space, that is obtained by diffraction and scattering of X-rays caused by an object material for the X-rays to irradiate reflects information of an electron density distribution in an actual space of the object material. However, the XRDS pattern being on the two-dimensional space of r and θ does not directly represent symmetry in the actual space of the object material that is a three-dimensional space. Accordingly, it is generally difficult to specify the (spatial) arrangement of atoms and molecules that constitute the material only with the existing XRDS image, and thus a specialized knowledge of X-ray structure analysis is required. Therefore, according to the present Example, automatization is achieved by adopting the above-described measurement application software.

Figure 6A:
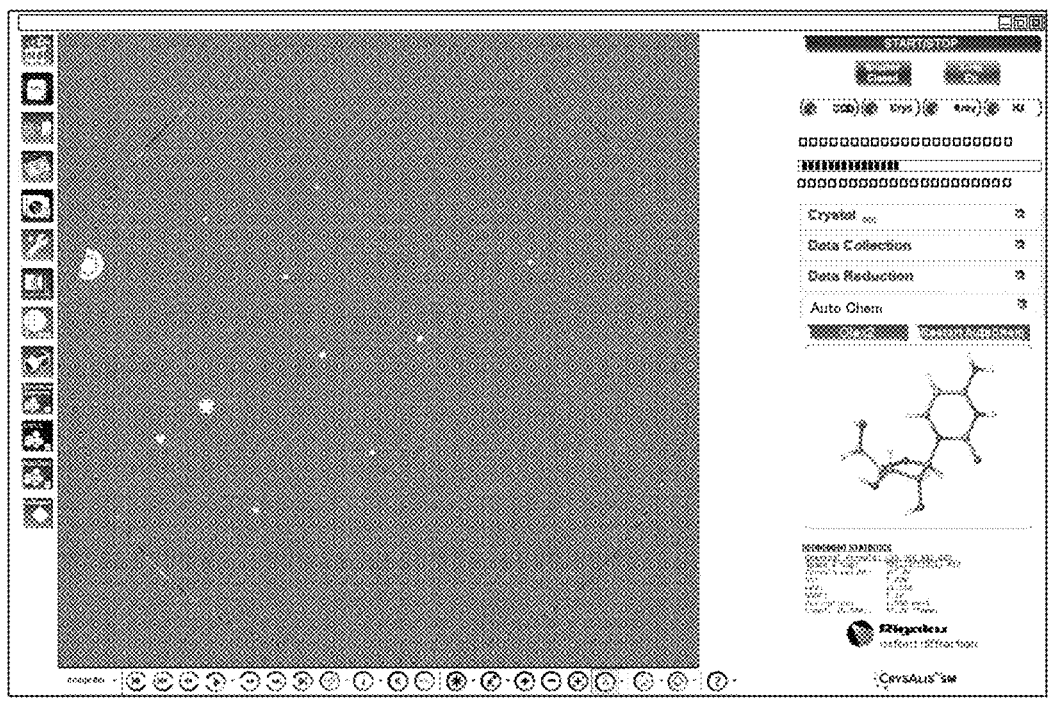
FIG. 6A is a diagram showing an execution screen of an application software for the measurement of the single-crystal X-ray structure analysis apparatus relating to Example 1 according to the present invention.
Figure 6B:
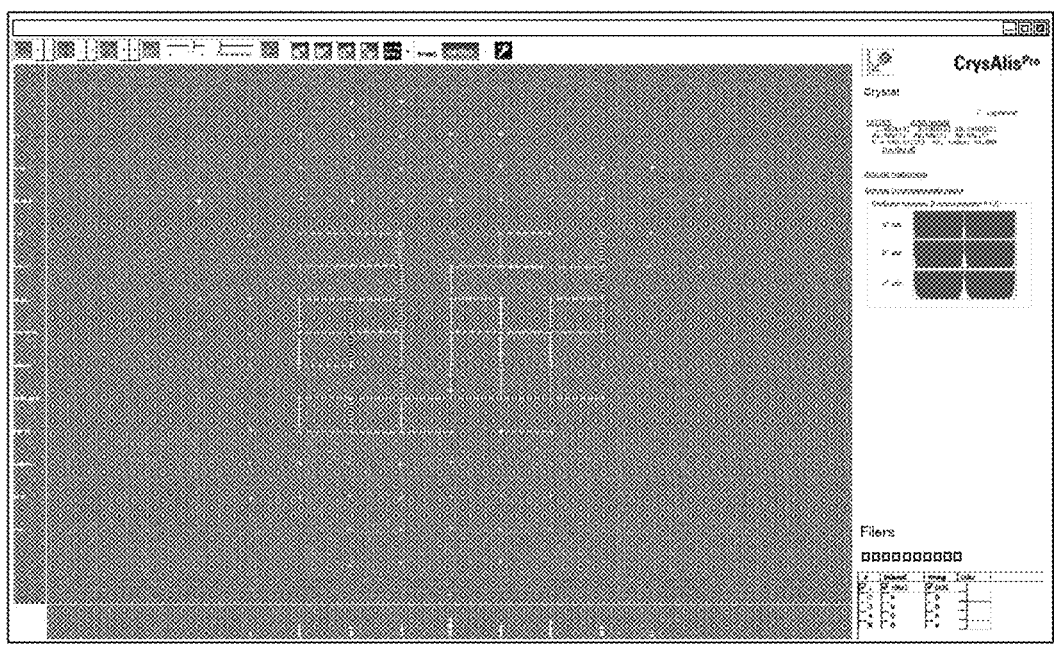
FIG. 6B is a diagram showing another execution screen of an application software for the measurement of the single-crystal X-ray structure analysis apparatus relating to Example 1 according to the present invention.
Figure 7:
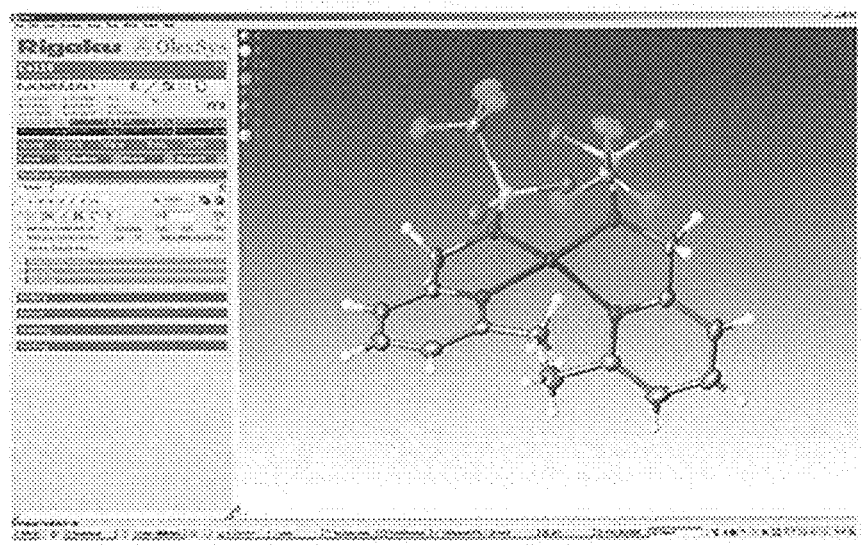
FIG. 7 is a diagram of a screen obtained by displaying a molecular model prepared using a structure analysis program of the single-crystal X-ray structure analysis apparatus relating to Example 1 according to the present invention.

For one example, as shown in the execution screens of FIGS. 6A and 6A, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 7.

The whole structure of the single-crystal X-ray structure analysis apparatus 500, and its function have been described as above, and a crystalline sponge according to the present invention, and devices and tools related thereto are specifically described below in detail, referring to the attached drawings.

Crystalline Sponge

As described above, via development of a material called "crystalline sponge" that is a very small and fragile porous complex crystal having an approximate size of several 10 μm to several 100 μm, whose inside has countless pores having a diameter of 0.5 to 1 nm are formed, the single-crystal X-ray structure analysis has become widely applicable for those including a liquid compound that cannot be crystallized or a very small amount of a sample having several ng to several μg that is incapable of acquiring a sufficient amount to perform crystallization.

However, in the current situation, in order to perform soaking (post-crystallization) that is crystallization of a sample into a framework of the above-described crystalline sponge, as previously described, required is a step of soaking a very small amount of a sample, having approximately several ng to several μg, separated by variouspretreatment (separation) devices in a framework of a very small and fragile crystalline sponge having an outer diameter of approximately 100 μm provided via immersion in a preserving solvent (carrier) such as cyclohexane or the like, inside a container. Examples of the preserving solvent (carrier) include liquid, a gaseous body (gas), and a supercritical fluid in the middle of them. Subsequently, further required is a step of taking out, from a container, a very small, fragile and difficultly handleable crystalline sponge quickly (in a short period of time in such an extent that the crystalline sponge is not broken due to being dried) , and accurately installing it to an X-ray irradiation position inside a diffractometer, more specifically, to a tip portion of a sample axis of the goniometer 512 (so-called goniometer head pin) while performing centering.

These steps are not only fine operations for which high preciseness is required but also those for which rapidness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of wide use of the single-crystal X-ray structure analysis using the crystalline sponge being impeded.

The present invention that has been accomplished based on the above-described inventor's knowledge enables a single-crystal X-ray structure analysis with a very small and fragile crystalline sponge to be surely and easily performed by using a sample holder (also referred to simply as a sample holder) as described below, in other words, achieves a high-yield, efficient, very versatile and user-friendly single-crystal X-ray structure analysis apparatus.

That is, as to the next-generation single-crystal X-ray structure analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and quickly attached to a predetermined position in the tip portion of the goniometer, but specifically in order to achieve the very versatile and user-friendly apparatus, such operations need to be made quickly and easily executable without requiring highly specialized knowledge as well as operation precision (preciseness).

The present invention described below in detail resolves such a problem, that is, provides an apparatus and a method for performing a high-yield, efficient, very versatile and user-friendly single-crystal X-ray structure analysis quickly, surely and easily by anyone while using a very small, fragile and difficultly handleable crystalline sponge; and further provides a sample holder as a tool therefor.

EXAMPLE 1

The configuration of the soaking machine 300 for soaking an analysis object sample in a crystalline sponge according to the configuration of the single-crystal X-ray structure analysis system 100 comprising the single-crystal X-ray structure analysis apparatus 500 relating to Example 1 according to the present invention as shown in FIG. 1 is described referring to FIGS. 8 to 14.

Figure 8:
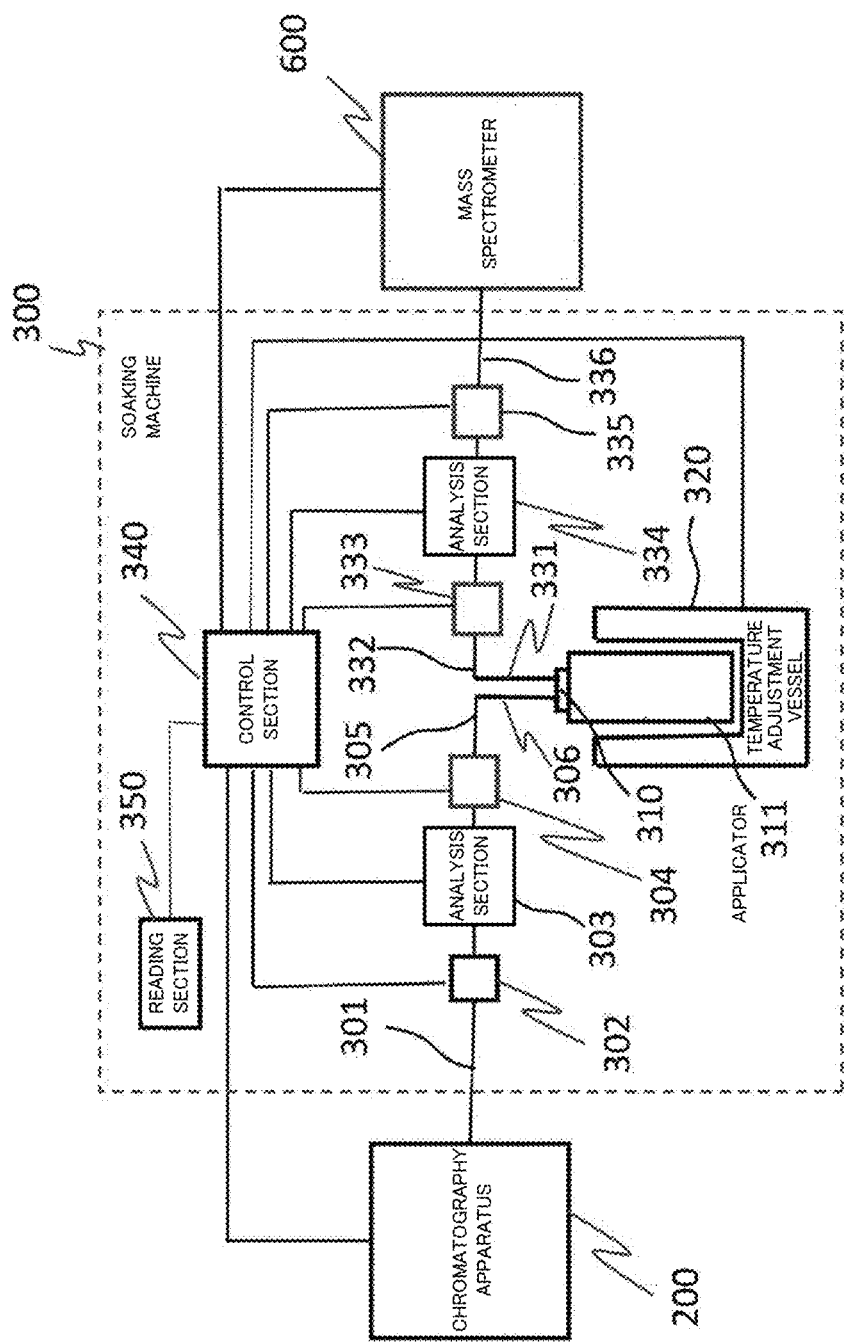
FIG. 8 is a block diagram showing a configuration of the soaking machine relating to Example 1 according to the present invention.

FIG. 8 is a block diagram showing a configuration of the soaking machine 300 for the single-crystal X-ray structure analysis apparatus 500 relating to Example 1 according to the present invention. The soaking machine 300 relating to the present Example comprises a supply side pipe 301, a supply side first actuator 302, a supply side analysis section 303, a supply side second actuator 304, a supply side piping 305, an injection needle (injection pipe) 306, an applicator 311 into which a sample holder 310 (corresponding to a sample holder 513 in FIG. 3) is attached, a temperature adjustment unit (temperature adjustment vessel) 320, a discharge needle (discharge pipe) 331, a discharge pipe 332, a discharge side first actuator 333, a discharge side analysis section 334, a discharge side second actuator 335, a discharge side piping 336, a control section 340, and a reading section 350.

According to the soaking machine 300, a carrier or a solvent (hereinafter, referred to as a sample inclusive of each of these) containing an analysis object sample that has been supplied from a separation apparatus (for example, gas chromatography, liquid chromatography or the like) 200 is supplied through the supply side piping 301, and a flow rate, a pressure and so forth of the sample are adjusted by the supply side first actuator 302.

Figure 9:
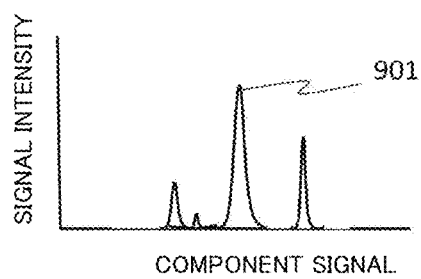
FIG. 9 is a graph showing one example of an output waveform of a sensor on the supply side in the soaking machine relating to Example 1 according to the present invention.

Next, the analysis object sample is sent to the supply side analysis section 303, and components of the sample whose pressure, concentration and temperature are adjusted are analyzed. One example of the analysis results is shown in FIG. 9. The graph of FIG. 9 shows that the sample sent from the separation apparatus 200 has a peak 901 in signal intensity at a specific component.

The sample that has been analyzed by the supply side analysis section 303 is sent from the supply side piping 305 to the injection needle 306 whose tip portion is inserted in the sample holder 310 attached into the applicator 311, and is supplied to the sample holder 310 inside the applicator 311 from the tip portion of the injection needle 306. At this time, only a sample or a solution in which the sample and the preserving solvent (carrier) are mixed flows inside a sample introduction pipe 254 on the supply side, and is supplied. The injection needle 306 is driven by drive means that is not shown in the figure, and is inserted in the sample holder 310 attached into the applicator 311.

The temperature adjustment unit 320 is controlled by the control section 340 in this state, and the applicator 311 is heated or cooled so that the applicator 311 comprising the sample holder 310 reaches a desired temperature.

When using the soaking device 300, an excessive sample or the solution in which the sample and the preserving solvent (carrier) are mixed is discharged via the discharge pipe 332 from the discharge needle 331 inserted into the sample holder 310 whose tip portion is attached into the applicator 311 by operating the discharge side first actuator 333, after elapse of a predetermined time in a state where the sample is injected from the injection needle 306 into the sample holder 310 attached into the applicator 311 whose temperature is controlled by the temperature adjustment unit 320. That is, the excessive sample means a sample discharged depending on the length of the discharge needle 331. The discharge needle 331 is driven by the drive means that is not shown in the figure, and is inserted into the sample holder 310. When not using the soaking device 300, the unnecessary preserving solvent (carrier) or solution flows inside the sample introduction pipe 254 on the discharge side, and is discharged. Accordingly, it is possible that no sample flows through the sample introduction pipe 254 on the discharge side. In addition, when using gas or supercritical fluid as a carrier, the carrier containing the sample is discharged.

Figure 10:
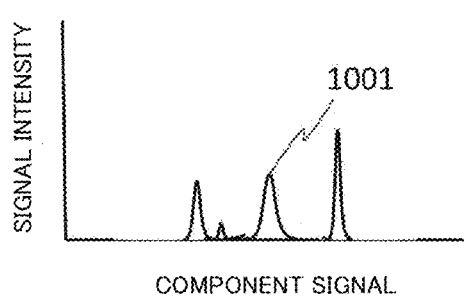
FIG. 10 is a diagram including a graph showing one example of an output waveform of a sensor on the discharge side in the soaking machine relating to Example 1 according to the present invention.

As to a sample discharged from the inside of the applicator 311 by the discharge side first actuator 333, its component is analyzed by the discharge side analysis section 334. One example of the result obtained by the analysis is shown in FIG. 10. The sample discharged from the inside of the applicator 311, whose component is analyzed by the discharge side analysis section 334 is sent to a mass spectrometer 600 from the discharge side piping 336 by adjusting a pressure, a flow rate, or a concentration with the discharge side second actuator 335 to analyze the mass component.

Herein, it is understood that the peak 1001 at the component in the graph of FIG. 10, that corresponds to the component signal at which the intensity peak 901 is shown in FIG. 9 is lowered when comparing the graph of FIG. 10 obtained via analysis performed by the discharge side analysis section 334 with the graph of FIG. 9 obtained via analysis performed by the supply side analysis section 303. This means that a part of component at which the peak is shown in FIG. 9 is consumed inside the applicator 311.

It is determined that an analysis object sample is soaked in a crystalline sponge attached to a tip portion of the sample holder 310 attached into the applicator 311 at the time when the difference or ratio between both the peak values becomes a predetermined value by comparing data as shown in the FIG. 9 with data as shown in FIG. 10 via the control section 340, followed by completing a series of operations.

Figure 11:
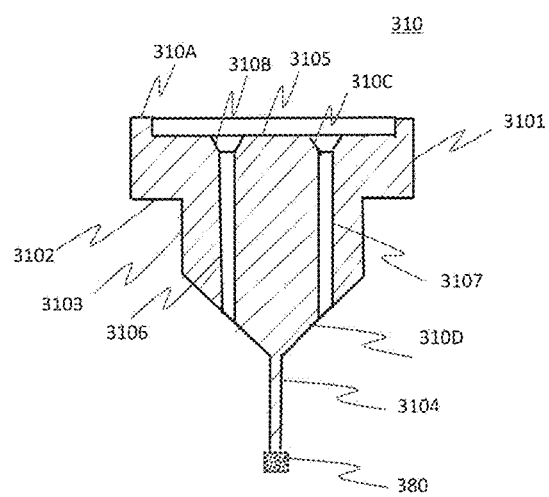
FIG. 11 is a sectional view showing a sample holder in a soaking machine relating to Example 1 according to the present invention.

A sectional view when the sample holder 310 is viewed from the front surface is shown in FIG. 11. The sample holder 310 is formed with a flat surface 3102 at one end of the base portion 3101 supported by a handling operator. A body part 3103 whose outer diameter is smaller than that of the base portion 3101 is formed at a tip of the flat surface 3102; a guide surface 310D processed into a taper shape is formed at a tip of the body part 3103; and a thin pin 3104 is formed in the tip portion.

A recessed portion 3105 that is a positioning member for attaching the sample holder to the goniometer head 514 in the single-crystal X-ray structure analysis apparatus 500 is formed on the upper surface 310A of the figure, that is another end surface of the base portion 3101. Further, a hole 3106 for injection needle and a hole 3107 for discharge needle passing through the body part 3103 from the base portion 3101 are formed in the sample holder 310. The taper portions 310B and 310C processed into taper shape are formed on the respective end surfaces on the recessed portion 3105 side in the hole 3106 for injection needle and the hole 3107 for discharge needle. The taper portions 310B and 310C become guide surfaces when inserting the injection needle 306 and the discharge needle 331.

The entire sample holder 310 or the recessed portion 3105 as a part of the base portion 3101 is formed of a magnetic body to connect magnetically with the magnetic body in the tip portion of the goniometer head 514.

The crystalline sponge 380 in which an analysis sample is soaked is attached (adhered) to the tip portion of the pin 3104. This crystalline sponge 380 is formed of a different component depending on a type of object sample to be analyzed.

Figure 12:
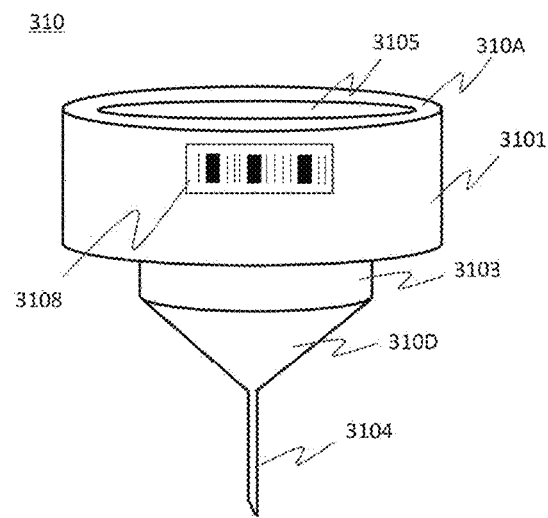
FIG. 12 is a perspective view showing a sample holder in the soaking machine relating to Example 1 according to the present invention.

In FIG. 12, the appearance of the sample holder 310 is shown as a perspective view. The information storage section 3108 for storing information (information about the type of crystalline sponge 380, the lot number and so forth) about the crystalline sponge 380 attached (adhered) to the tip portion of the pin 3104 is formed on the outer peripheral surface of the base portion 3101. The information storage section 3108 is formed by for example, a bar-code, a QR code (registered trademark), an IC chip or the like.

Information stored in the information storage section 3108 is read by the reading section 350 shown in FIG. 8, and stored inside the control section 340. The control section 340 controls the supply side first actuator 302, the supply side analysis section 303, the supply side second actuator 304, the temperature adjustment unit 320, the discharge side first actuator 333, the discharge side analysis section 334 and the discharge side second actuator 335 based on the information stored in the information storage section 3108, that is read by the reading section 350; and soaks the sample in the crystalline sponge 380 by supplying the analysis object sample from the injection needle 306 to the crystalline sponge 380 attached (adhered) to the tip portion of the pin 3104 of the sample holder 310.

The control section 340 stores the soaking condition (condition of including any of a temperature, a pressure, a concentration, a processing time and so forth of the sample supplied into the sample holder 310) when inside the applicator 311, the sample is soaked in the crystalline sponge 380. The soaking condition stored in the control section 340 can be transferred to the other processing means via a communication line that is not shown in the figure.

Figure 13:
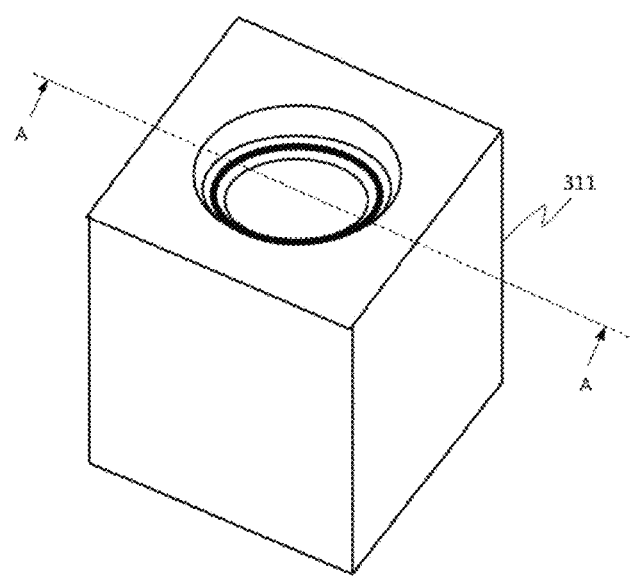
FIG. 13 is a perspective view showing an applicator that stores a sample holder in the soaking machine relating to Example 1 according to the present invention.

In FIG. 13, the appearance of the applicator 311 into which the sample holder 310 is attached is shown as a perspective view. The appearance of the applicator 311 has a shape of cuboid. Further, applicators 311 formed of a resin are differentiated by colors, depending on a type of crystalline sponge 380 attached to the tip portion of the pin 3104 of the sample holder 310 attached therein. By this, the type of crystalline sponge 380 attached to the tip of the pin 3104 of the sample holder 310 can be determined from the color of the applicator 311 in a state where the sample holder 310 is attached into the applicator 311.

Figure 14:
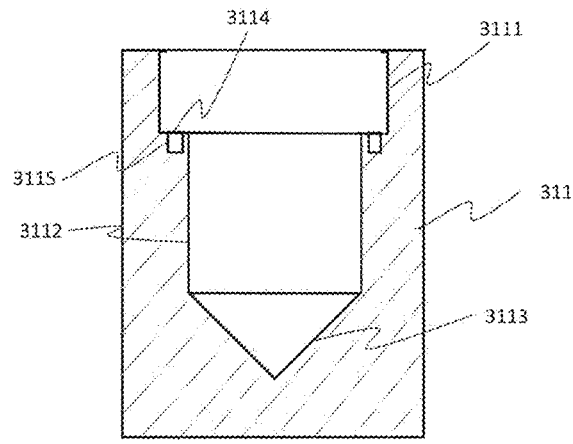
FIG. 14 is a sectional view showing an applicator for storing a sample holder in the soaking machine relating to Example 1 according to the present invention.

The A-A cross-section of the applicator 311 of FIG. 13 is shown in FIG. 14. A portion 3111 in which the base portion 3101 of the sample holder 310 is inserted, a cylindrical portion 3112 in which the body part 3103 of the sample holder 310 is inserted, and a tip portion 3113 in which the pin 3104 of the sample holder 310 is inserted are formed in the applicator 311. The conical shaped tip portion 3113 in which the pin 3104 is inserted has its diameter becoming smaller as it goes toward the tip. Further, an O-ring groove 3115 is formed on an inner surface 3114 where the applicator 311 comes into contact with the flat surface 3102 of the base portion 3101 of the sample holder 310.

Figure 15:
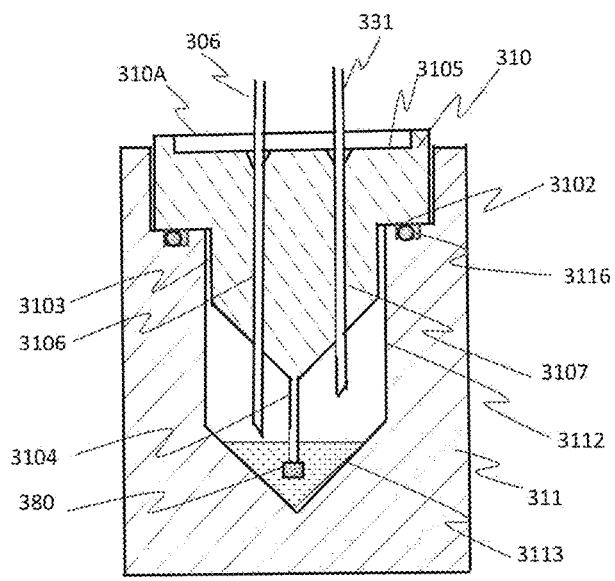
FIG. 15 is a sectional view showing a state where a sample holder in the soaking machine relating to Example 1 according to the present invention is stored in an applicator.

FIG. 15 shows a state where the sample holder 310 is attached into the applicator 311; the injection needle 306 and the discharge needle 331 are further inserted inside the applicator 311; and the crystalline sponge 380 is attached to the tip portion of the pin 3104 of the sample holder 310. Since the injection needle 306 supplies a sample near the crystalline sponge 380 attached to the tip portion of the pin 3104, it is inserted into the applicator 311 so as to become deeper than the discharge needle 331.

In this state, the sample holder 310 is pressed to the applicator 311 by pressing means that is not shown in the figure, and thus the O-ring 3116 is deformed by pressing the O-ring 3116 attached to the O-ring groove 3115 where the flat surface 3102 of the base portion 3101 of the sample holder 310 is formed on the inner surface 3114 of the applicator 311. Further, sealing by seal means that is not shown in the figure is applied respectively between the injection needle 306 and the hole 3106 for the injection needle, and between the discharge needle 331 and the hole 3107 for the discharge needle. By having such a configuration, the cylindrical portion 3112 in the applicator 311 into which the sample holder 310 is attached, and the conical shaped tip portion 3113 at the tip of the cylindrical portion can be made to maintain an airtight state to the outside.

In this state, the control section 340 shown in FIG. 8 controls the supply side first actuator 302, the supply side analysis section 303, the supply side second actuator 304 and the temperature adjustment unit 320 to supply the sample sent out from the chromatography apparatus 200, to the cylindrical portion 3112 and its tip portion 3113 in the applicator 311 from the injection needle 306.

Further, the control section 340 controls the discharge side first actuator 333, the discharge side analysis section 334 and the discharge side second actuator 335 to discharge the oversupplied samples out of the samples supplied into the inside of the cylindrical portion 3112 in the applicator 311 from the discharge needle 331.

The sample is soaked into the crystalline sponge 380 by maintaining the sample for a certain amount of time in a state of having been supplied to the cylindrical portion 3112 and its tip portion 3113 in the applicator 311. At this time, the control section 340 controls the supply side first actuator 302, the supply side analysis section 303, the supply side second actuator 304 and the temperature adjustment unit 320 to control the soaking condition under which the sample is soaked in the crystalline sponge, including a temperature, a pressure, a concentration, a processing time and so forth of the sample supplied to the cylindrical tip portion 3113 in the applicator 311 from the injection needle 306.

In addition, the state shown in the above-described FIG. 15 exhibits a state where the injection needle 306 and the discharge needle 331 as shown in the above-described FIG. 8 are inserted in the sample holder 310 and the applicator 311.

In addition, according to the configuration shown in FIG. 8 as described above, the mass spectrometer 600 has been described as a different configuration from the soaking machine 300 for a single-crystal X-ray structure analysis apparatus, but the mass spectrometer 600 may be a part of the soaking machine 300 for the single-crystal X-ray structure analysis apparatus by integrating the mass spectrometer 600 with the single-crystal X-ray structure analysis 300.

Figure 16:
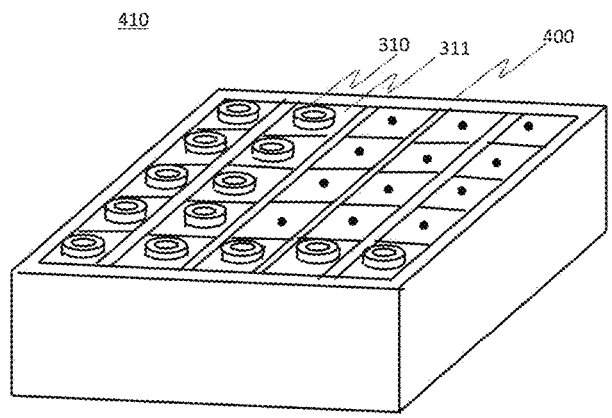
FIG. 16 is a perspective view showing a sample tray in which a plurality of applicators are stored, the plurality of applicators where a sample holder with a sample being soaked there is attached into, in a tip portion, by the soaking machine relating to Example 1 according to the present invention.

FIG. 16 is a perspective view of a sample tray (well plate) 410, showing a state where a plurality of applicators 311 are stored inside a tray 400, the plurality of applicators into which a sample holder 310 is attached, the sample holder in a tip portion of which a sample is soaked by the soaking machine for the single-crystal X-ray structure analysis apparatus relating to the present Example. The plurality of applicators 311 into which the sample holder 310 is attached are stored in the sample tray 410, but color of the applicator 311 is differentiated depending on a type of the crystalline sponge 380 in which an analysis sample is soaked, and thus the type of sample soaked in the crystalline sponge 380 inside the applicator 311 of each color can be easily determined by color thereof.

According to the present Example, a sample can be more safely soaked into a very small and fragile crystalline sponge 380 attached to the tip portion of the pin 3104 of the sample holder 310, in a state where the sample holder 310 is attached into the applicator 311.

Further, according to the present Example, the control section 340 controls the supply side first actuator 302, the supply side analysis section 303, the supply side second actuator 304, the discharge side first actuator 333, the discharge side analysis section 334, the discharge side second actuator 335, and further the temperature adjustment unit 320 to soak the sample into the crystalline sponge 380; and thus it becomes easier to set the soaking condition of an analysis object sample than that in the case where soaking the sample was performed by a conventional manual operation.

Furthermore, according to the present Example, it can be easily confirmed by the control section 340 that a single-crystal made from the sample is formed inside the crystalline sponge 380, by comparing data obtained via analysis with the supply side analysis section 303 with data obtained via analysis with the discharge side analysis section 334.

EXAMPLE 2

Figure 17:
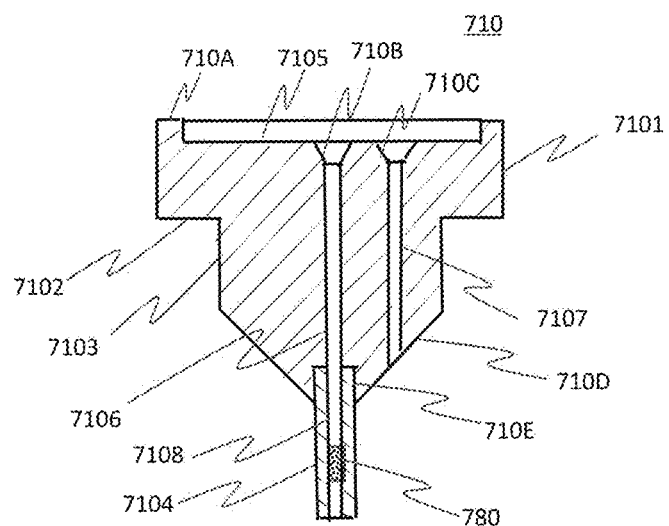
FIG. 17 is a sectional view showing a sample holder in the soaking machine relating to Example 2 according to the present invention.

The configuration in which the crystalline sponge 380 is attached to the tip portion of the pin 3104 of the sample holder 310 has been described in Example 1, but the case of using a sample holder 710 in the configuration as shown in FIG. 17 is described in the present Example.

According to the present Example, the configuration excluding the sample holder 710 is the same configuration as shown in FIG. 8 in Example 1 and the configuration of the applicator 311 is also the same as the shape of the applicator 311 that has been described using FIGS. 13 to 15 in Example 1, and thus detailed description is omitted.

In the sample holder 710 used in the present Example, as its cross-sectional shape being shown in FIG. 17, a pipe 7104 is newly attached and fixed to a recessed portion 710E formed in the tip portion of a guide surface 710D processed into a taper shape, ahead of the body part 7103 of the sample holder 710. A hole 7108 connected to a hole 7106 for injection needle, that is formed in the sample holder 710 is formed inside the pipe 7104. A crystalline sponge 780 in which a sample is soaked is formed (or attached) inside the hole 7108 of the pipe 7104.

The body of the sample holder 710 is formed of magnetic metal, but its pipe 7104 formed of a material transmitting X-rays such as, for example, borosilicate glass, quartz, kapton or the like is inserted in the recessed portion 710E formed in the tip portion of the guide surface 710D, and is further fixed with an adhesive or the like.

A base portion 7101 of the sample holder 710, a lower surface 7102 of the base portion 7101, and a recessed portion 7105 inside an upper surface 710A of the base portion 7101, respectively, are the same as the configuration of corresponding portions to the sample holder 310 described in Example 1, and thus detailed description is omitted.

In the present Example, the injection needle 306 is inserted in the hole 7106 for injection needle, and the discharge needle 331 is inserted in the hole 7107 for discharge needle by attaching the sample holder 710 in such a configuration into the applicator 311 described in Example 1 referring to FIG. 14. A taper portion 710B to be a guide surface, when inserting the injection needle 306, is formed, at an end portion on an upper side of the hole 7106 for injection needle. A taper portion 710C to be a guide surface, when inserting the discharge needle 331, is formed, at an end portion on an upper side of the hole 7107 for discharge needle.

The configuration in which a sample is supplied to a crystalline sponge 780 from the injection needle 306 inserted in the hole 7106 for injection needle, at an upper end portion of which the taper portion 710B is formed; and from which gas or liquid inside the applicator 311 is discharged by the discharge needle 331 is the same as the case in Example 1, and thus detailed description is omitted.

In addition, according to the configuration shown in FIG. 17, a case where a hole 7108 formed into a pipe 7104 has the same diameter from top to bottom is shown, but in FIG. 17, the hole 7108 may have a taper shape in such a manner the diameter becomes larger as it goes toward the lower side, or may be formed into a stepped shape in such a manner that the diameter becomes larger in the midway than that on the upper side.

According to the present Example, the sample can be more safely soaked into a very small and fragile crystalline sponge 780 attached into the hole 7108 for injection needle, that is formed by passing through the pipe 7104 at the center portion of the sample holder 710, in a state where the sample holder 710 is attached into the applicator 311.

Further, according to the present Example, similarly to the case in Example 1, the control section 340 controls the supply side first actuator 302 and the supply side analysis section 303, and further the supply side second actuator 304; and the discharge side first actuator 333, the discharge side analysis section 334, the discharge side second actuator 335, and further the temperature adjustment unit 320 to soak a sample in the very small and fragile crystalline sponge 780; and thus it becomes easier to set the soaking condition of the sample than that in the case where soaking the sample in the crystalline sponge was performed by a conventional manual operation.

Furthermore, according to the present Example, similarly to the case in Example 1, it can be easily confirmed with the control section 340 that the sample is surely soaked into the crystalline sponge 780, by comparing data obtained via analysis with the supply side analysis section 303 with data obtained via analysis with the discharge side analysis section 334.

EXAMPLE 3

According to the configuration comprising the soaking machine 300 of FIG. 8 as described in Example 1, it is made to become a configuration in which gas or sample liquid discharged from the inside of the applicator 311 by the discharge needle 331 is sent to a mass spectrometer 600 to be discharged. In contrast, according to the present Example, as shown in FIG. 18, there is provided a return route 360 for sending the sample discharged from the mass spectrometer 600, to a chromatography apparatus 200.

The sample whose predetermined component is extracted again by chromatography apparatus 200, that has been returned to the chromatography apparatus 200 from the mass spectrometer 600 through the return route 360 is supplied to the soaking machine 300. By having such a configuration, the sample circulates between the chromatography apparatus 200 and the mass spectrometer 600 through the soaking machine 300. The operation of the soaking machine 300 is identical to one described in Example 1.

Figure 18:
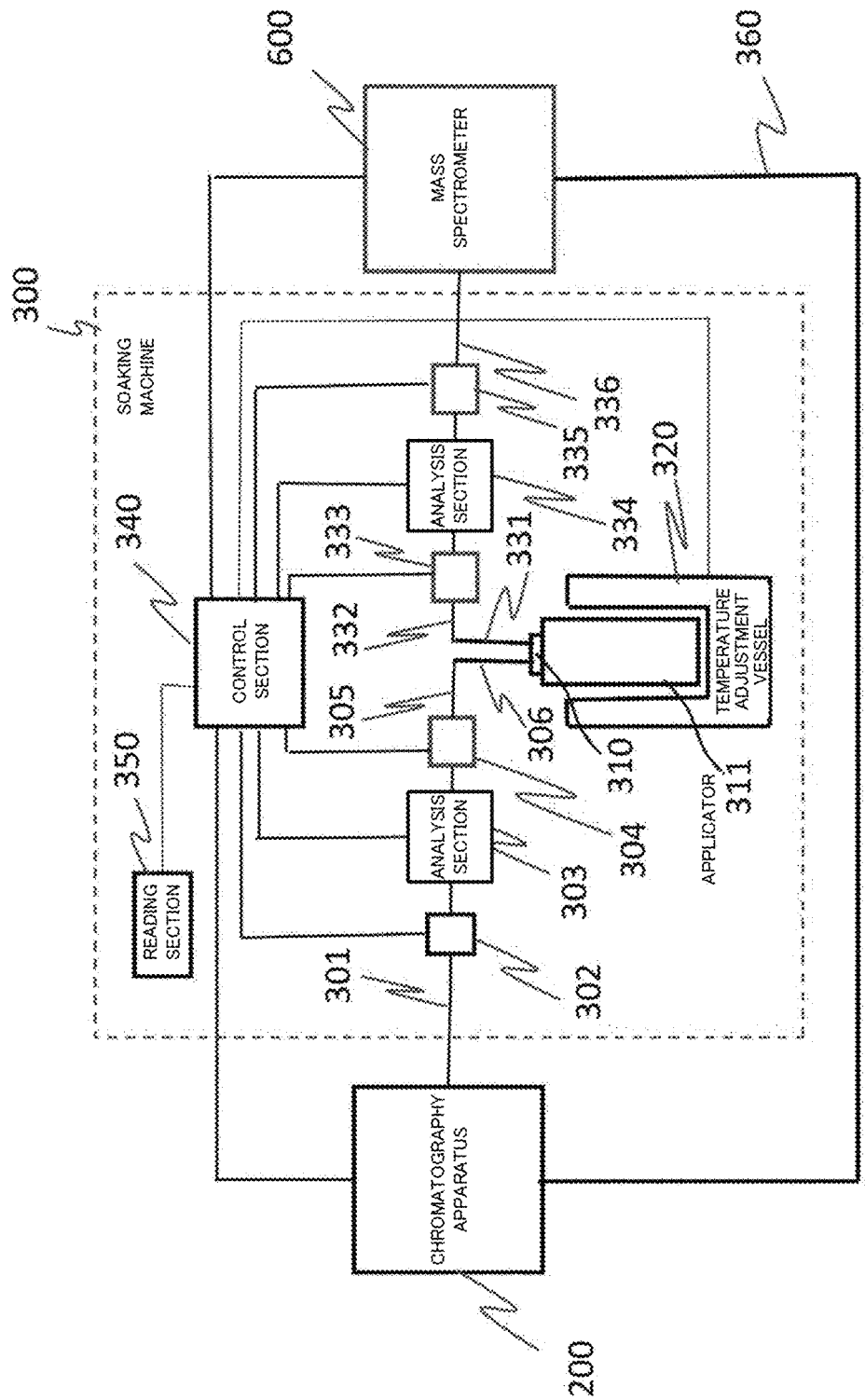
FIG. 18 is a block diagram showing a configuration of the soaking machine relating to Example 3 according to the present invention.

According to the present Example, by having the configuration as shown in FIG. 18, it was made detectable that soaking of an object sample in the crystalline sponge 380 reached an end point thereof by comparing analysis waveform data (corresponding to FIG. 10 in Example 1) of the component discharged from the applicator 311, that was detected with the discharge side analysis section 334, with waveform data (corresponding to FIG. 9 in Example 1) that was detected with the supply side analysis section 303.

That is, as to the duration of soaking the object sample in the crystalline sponge 380, the peak value of a wave form of the sample component in the middle of being soaked in the crystalline sponge 380, out of waveform data detected by the discharge side analysis section 334, decreases with time. In contrast, no component corresponding to the object sample is consumed when it is completed to soak the analysis object sample in the crystalline sponge 380, and thus the wave height value corresponding to an aimed sample component of waveform data detected by the discharge side analysis section 334 becomes identical value to the wave height value corresponding to an aimed sample component of waveform data detected by the supply side analysis section 303.

In the present Example, by using this characteristic via the configuration as shown in FIG. 18, a point of time when the peak levels are identical to each other is detected as an end point by comparing waveform data at the position corresponding to the single-crystal component detected by the supply side analysis section 303 with waveform data at the position corresponding to the single-crystal component detected by the discharge side analysis section 334.

According to the present Example, a sample can be used while making it circulate between the chromatography apparatus 200 and the mass spectrometer 600 through the soaking machine 300, and thus it can be surely detected that an analysis object sample is soaked in a very small and fragile crystalline sponge, even when the amount of sample is very small.

In addition, though various Examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, a part of a configuration of one Example may be replaced with a configuration of another Example, and with respect to a part of a configuration of each Example, further performed may be addition/deletion/replacement of another configuration.

The present invention is widely applicable for a searching method of a material structure, an X-ray structure analysis apparatus used for the same, and so forth.

In addition, the present international application claims priority under Japanese Patent Application No. 2018-219809, filed in Nov. 21, 2018, and the entire content of Japanese Patent Application No. 2018-219809 is applied to the present international application.

EXPLANATION OF THE SYMBOLS

100 . . . Single-crystal X-ray structure analysis system, 200 . . . Chromatography apparatus, 300 . . . Soaking apparatus for single-crystal X-ray structure analysis apparatus, 302 . . . Supply side first actuator, 303 . . . Supply side analysis section, 304 . . . Supply side second actuator, 306 . . . Injection needle, 310, 710 . . . Sample holder, 311 . . . Applicator, 320 . . . Temperature adjustment unit, 331 . . . Discharge needle, 333 . . . Discharge side first actuator, 334 . . . Discharge side analysis section, 335 . . . Discharge side second actuator, 340 . . . Control section, and 350 . . . Reading section.

The invention claimed is:

1. A soaking machine for soaking a sample, said soaking machine comprising:
    a supply section that supplies the sample into an applicator in which a sample holder that holds a porous complex crystal is inserted,
    a temperature adjustment section that controls a temperature of the applicator,
    a discharge section that discharges the sample from the inside of the applicator in which the sample holder is inserted, and
    a control section that controls the supply section, the temperature adjustment section and the discharge section to perform the soaking of the sample at a desired temperature.

2. The soaking machine according to claim 1,
    wherein the supply section comprises an injection pipe inserted in the applicator by passing through a first through-hole formed in the sample holder, and
    the injection pipe supplies the sample into the applicator via the injection pipe.

3. The soaking machine according to claim 2,
    wherein the discharge section comprising a discharge pipe configured to discharge the sample from the inside of the applicator by passing through a second through-hole formed in the sample holder, via the discharge pipe inserted in the applicator.

4. The soaking machine according to claim 3,
wherein the discharge section comprises:
a discharge pipe capable of being inserted in the applicator by passing through a second through-hole formed in the sample holder;
a discharge side first actuator to which the sample is discharged from the inside of the applicator via the discharge pipe;
a discharge side analysis section configured to analyze a component of the sample discharged to the discharge side first actuator; and
a discharge side second actuator configured to adjust a pressure, a flow rate or a concentration of the sample whose component is analyzed by the discharge side analysis section to discharge the sample.

5. The soaking machine according to claim 2,
wherein the discharge section comprises:
a discharge pipe capable of being inserted in the applicator by passing through a second through-hole formed in the sample holder;
a discharge side first actuator to which the sample is discharged from the inside of the applicator via the discharge pipe;
a discharge side analysis section configured to analyze a component of the sample discharged to the discharge side first actuator; and
a discharge side second actuator configured to adjust a pressure, a flow rate or a concentration of the sample whose component is analyzed by the discharge side analysis section to discharge the sample.

6. The soaking machine according to claim 2,
wherein the control section is configured to control the supply section, the temperature adjustment section and the discharge section, and
the control section controls a soaking condition under which the sample is soaked in the porous complex crystal held by the sample holder.

7. The soaking machine according to claim 1,
wherein the discharge section comprises a discharge pipe inserted in the applicator by passing through a second through-hole formed in the sample holder, and
the discharge pipe discharges the sample from the inside of the applicator via the discharge pipe.

8. The soaking machine according to claim 7,
wherein the discharge section comprises:
a discharge pipe capable of being inserted in the applicator by passing through a second through-hole formed in the sample holder;
a discharge side first actuator to which the sample is discharged from the inside of the applicator via the discharge pipe;
a discharge side analysis section configured to analyze a component of the sample discharged to the discharge side first actuator; and
a discharge side second actuator configured to adjust a pressure, a flow rate or a concentration of the sample whose component is analyzed by the discharge side analysis section to discharge the sample.

9. The soaking machine according to claim 7,
wherein the control section is configured to control the supply section, the temperature adjustment section and the discharge section, and
the control section controls a soaking condition under which the sample is soaked in the porous complex crystal held by the sample holder.

10. The soaking machine according to claim 1,
wherein the supply section comprises:
a supply side first actuator that adjusts a pressure or a flow rate of the sample, the sample being supplied from a separation apparatus for extracting the sample for an analysis object;
a supply side analysis section that analyzes a component of the sample of which the pressure or the flow rate is adjusted by the supply side first actuator;
a supply side second actuator that adjusts a pressure or a flow rate of the sample analyzed by the supply side analysis section; and
an injection pipe that supplies the sample of which the pressure or the flow rate is adjusted by the supply side second actuator into the applicator, the injection pipe inserted in the applicator by passing through a first through-hole formed in the sample holder.

11. The soaking machine according to claim 10,
wherein the discharge section comprises:
a discharge pipe capable of being inserted in the applicator by passing through a second through-hole formed in the sample holder;
a discharge side first actuator to which the sample is discharged from the inside of the applicator via the discharge pipe;
a discharge side analysis section configured to analyze a component of the sample discharged to the discharge side first actuator; and
a discharge side second actuator configured to adjust a pressure, a flow rate or a concentration of the sample whose component is analyzed by the discharge side analysis section to discharge the sample.

12. The soaking machine according to claim 10,
wherein the control section is configured to control the supply section, the temperature adjustment section and the discharge section, and
the control section controls a soaking condition under which the sample is soaked in the porous complex crystal held by the sample holder.

13. The soaking machine according to claim 1,
wherein the discharge section comprises:
a discharge pipe capable of being inserted in the applicator by passing through a second through-hole formed in the sample holder;
a discharge side first actuator to which the sample is discharged from the inside of the applicator via the discharge pipe;
a discharge side analysis section that analyzes a component of the sample discharged to the discharge side first actuator; and
a discharge side second actuator that adjusts a pressure, a flow rate or a concentration of the sample whose component is analyzed by the discharge side analysis section to discharge the sample.

14. The soaking machine according to claim 1, the supply section comprising:
a supply side first actuator that adjusts a pressure or a flow rate of the sample supplied from the outside;
a supply side analysis section that analyzes a component of the sample of which the pressure or the flow rate is adjusted by the supply side first actuator;
a supply side second actuator that adjusts a pressure or a flow rate of the sample analyzed by the supply side analysis section;
an injection pipe through which the sample of which the pressure or the flow rate is adjusted by the supply side second actuator is supplied into the applicator, the injection pipe inserted in the applicator by passing through a first through-hole formed in the sample holder;

a discharge pipe inserted in the applicator by passing through a second through-hole formed in the sample holder;

a discharge side first actuator to which the sample is discharged from the inside of the applicator via the discharge pipe;

a discharge side analysis section that analyzes a component of the sample discharged to the discharge side first actuator;

a discharge side second actuator that adjusts a pressure, a flow rate or a concentration of the sample whose component is analyzed by the discharge side analysis section to discharge the sample, and a return route provided to connect the discharge side second actuator with the supply side first actuator, wherein the sample discharged to the discharge side second actuator is returned to the supply side first actuator.

15. The soaking machine according to claim 1, wherein the control section controlling the supply section, the temperature adjustment section and the discharge section controls a soaking condition under which the sample is soaked in the porous complex crystal held by the sample holder.

16. The soaking machine according to claim 1, comprising a reading section that reads information held by an information holding section included in the sample holder or the applicator;

wherein the control section stores the information read by the reading section.

17. The soaking machine according to claim 16, wherein the control section controls the supply section, the temperature adjustment section and the discharge section depending on a type of the sample supplied to the applicator from the supply section, based on the information read by the reading section.

18. A soaking method for soaking a sample, the soaking method comprising:

using a soaking machine to supply the sample to an applicator in which a sample holder that holds a porous complex crystal is inserted, and discharging the sample supplied to the applicator from the inside of the applicator by the soaking machine, wherein at least one of said supplying and of said discharging is performed in a state where a soaking condition including a temperature of the sample is controlled.

19. The method according to claim 18, wherein the sample is supplied via an injection pipe inserted in the applicator by passing through a first through-hole formed in the sample holder.

20. The method according to claim 18, wherein said discharging the sample is performed by discharging the sample by passing through a second through-hole formed in the sample holder, via a discharge pipe inserted in the applicator.

\* \* \* \* \*